(No Model.)

F. H. RICHARDS.
WEIGHING MACHINE.

No. 585,984.

6 Sheets—Sheet 1.

Patented July 6, 1897.

Witnesses:
Chas. D. King
Fred. J. Dole

Inventor:
F. H. Richards (No Model.)

F. H. RICHARDS.
WEIGHING MACHINE.

No. 585,984. Patented July 6, 1897.

Witnesses:
Chas. D. King.
Fred. J. Dole.

Inventor:
F. H. Richards (No Model.)
6 Sheets—Sheet 4.

F. H. RICHARDS.
WEIGHING MACHINE.

No. 585,984. Patented July 6, 1897.

Witnesses:
Chas. D. King.
Fred. J. Dole.

Inventor:
F. H. Richards.

(No Model.)  F. H. RICHARDS.  6 Sheets—Sheet 5.
WEIGHING MACHINE.
No. 585,984.  Patented July 6, 1897.
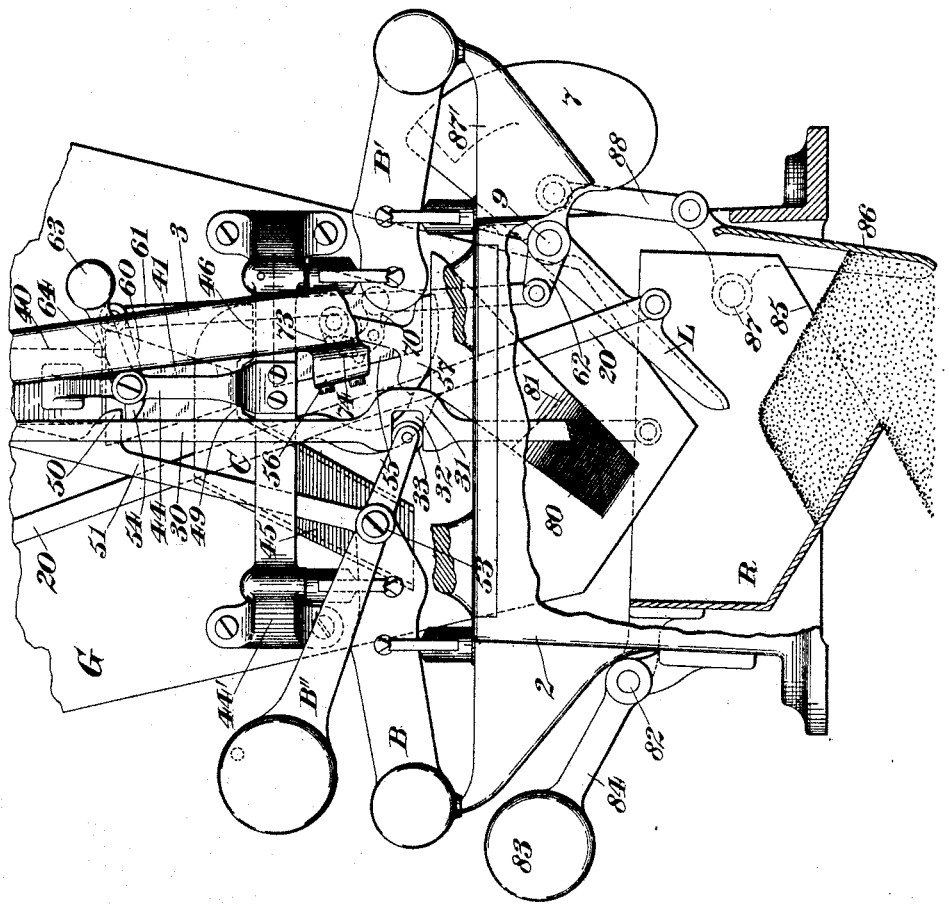
Witnesses:
Chas. D. King.
Fred. J. Dole.
Inventor:
F. H. Richards.

(No Model.) 6 Sheets—Sheet 6.
F. H. RICHARDS.
WEIGHING MACHINE.
No. 585,984. Patented July 6, 1897.
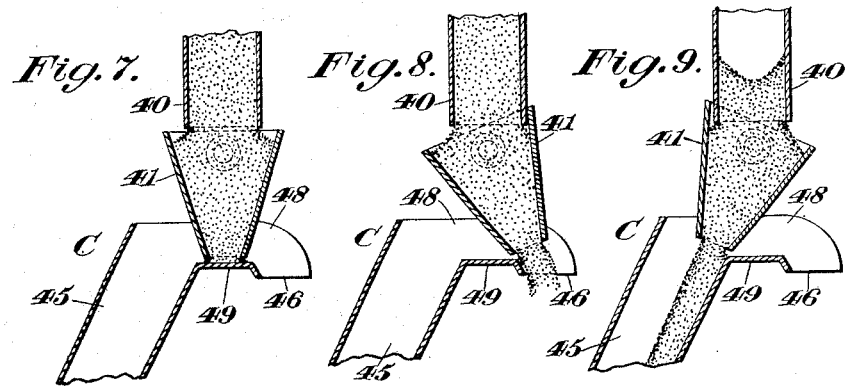
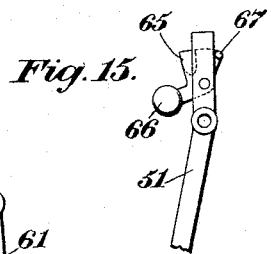
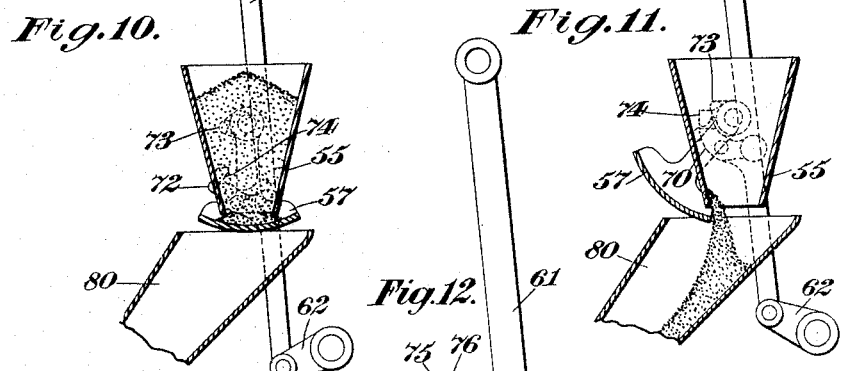
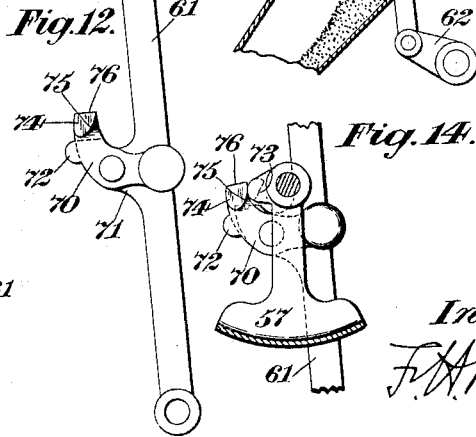
Witnesses:
Chas. D. King
Fred. J. Dole
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,984, dated July 6, 1897.

Application filed January 23, 1897. Serial No. 620,389. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of the type disclosed by Letters Patent No. 572,067, granted to me November 24, 1896, it comprehending, in conjunction with a suitable load-receiver, the employment of efficient overloading and load-reducing means preferably automatically operative in this order during the weighing of a load, whereby the machine can successfully weigh and deliver large quantities of material with promptness and accuracy.

Figure 1:
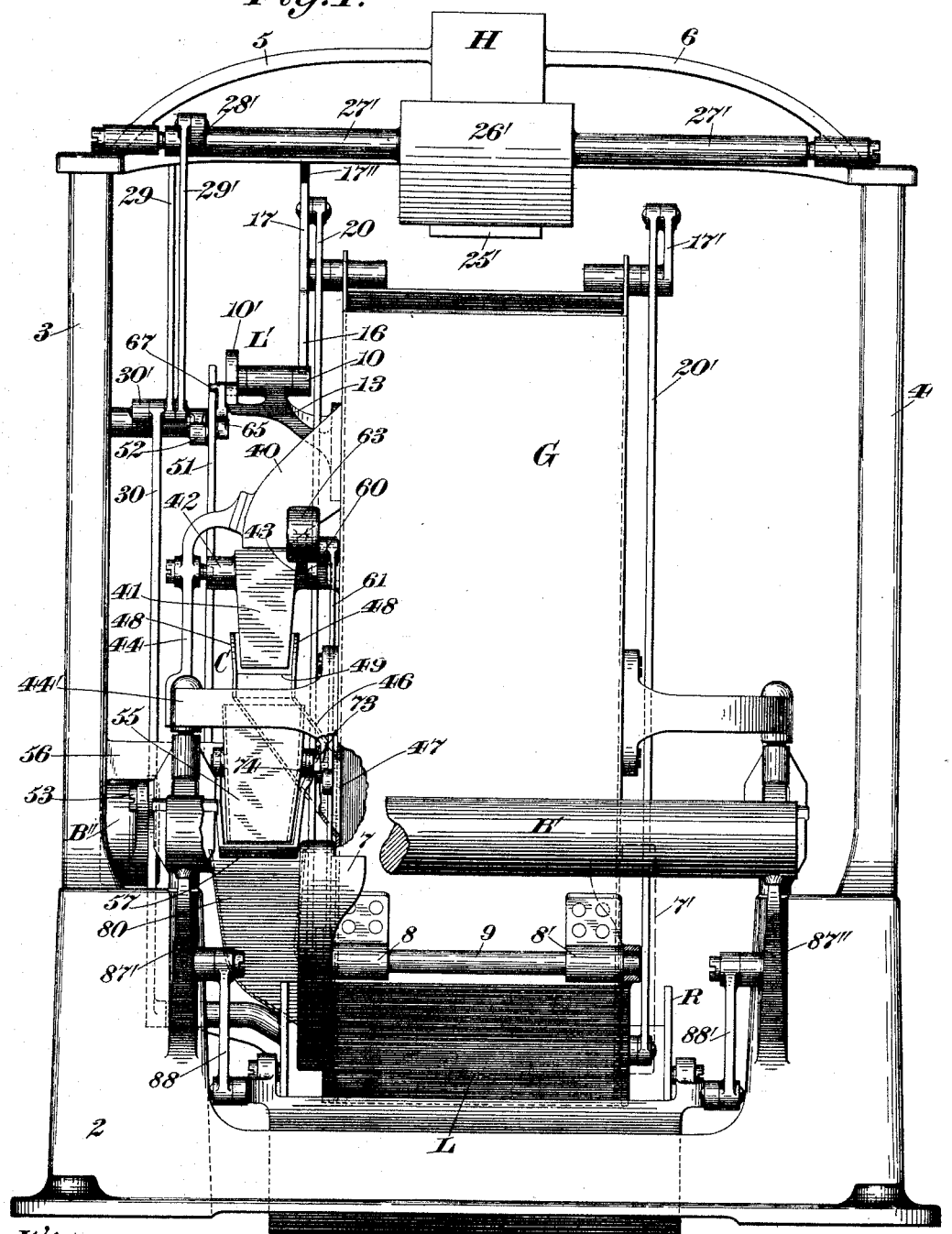
Figure 2:
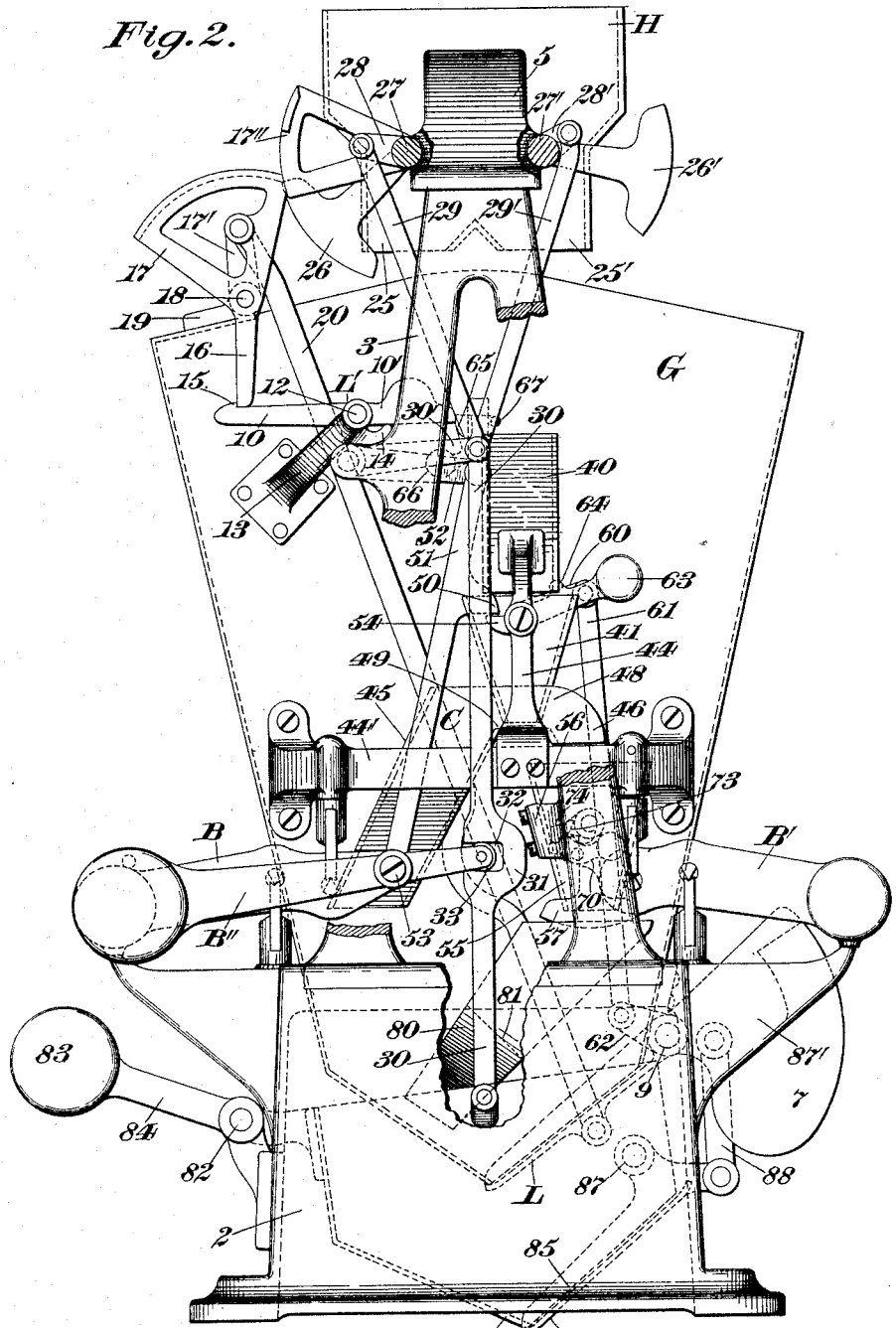
Figure 3:
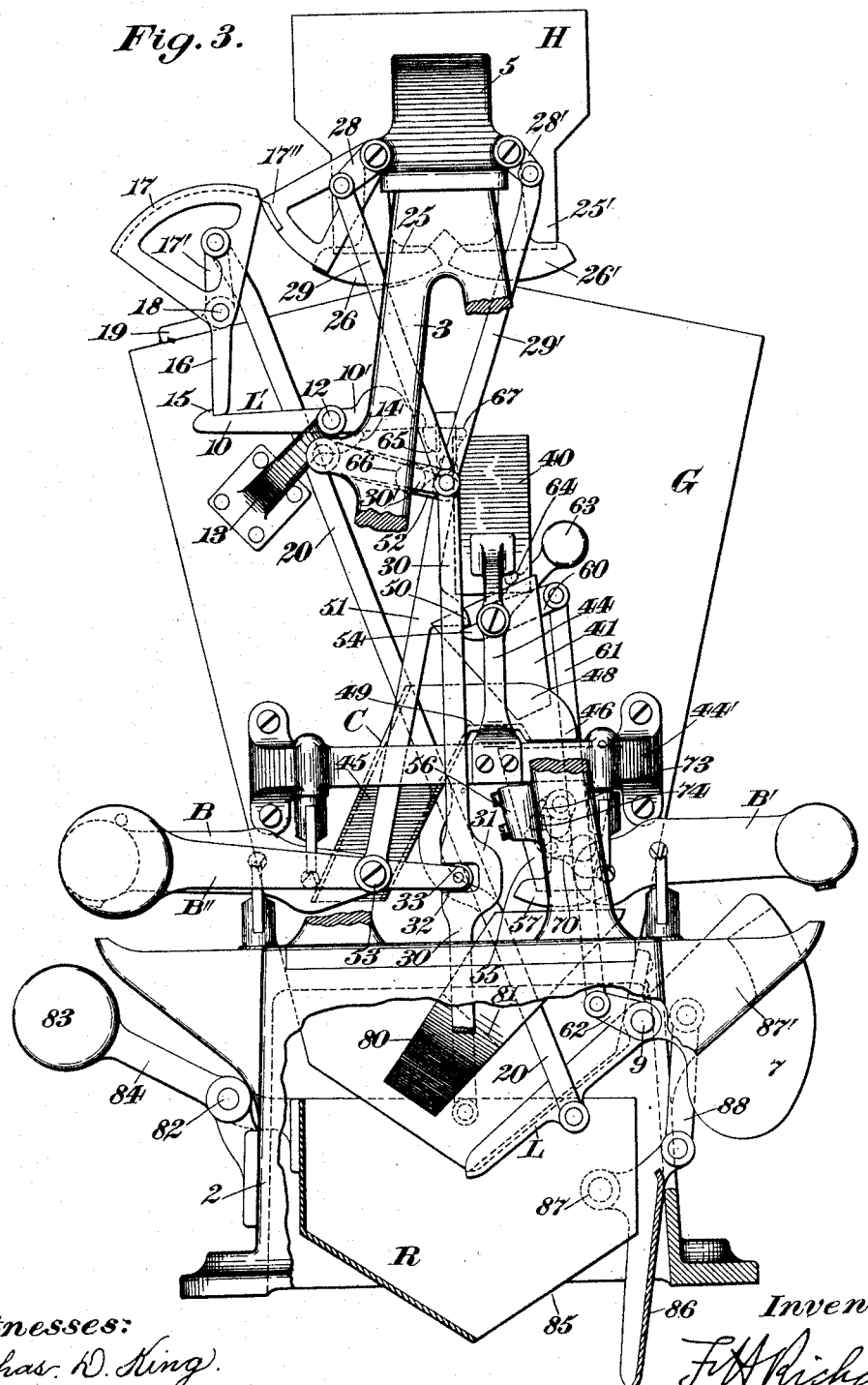
Figure 4:
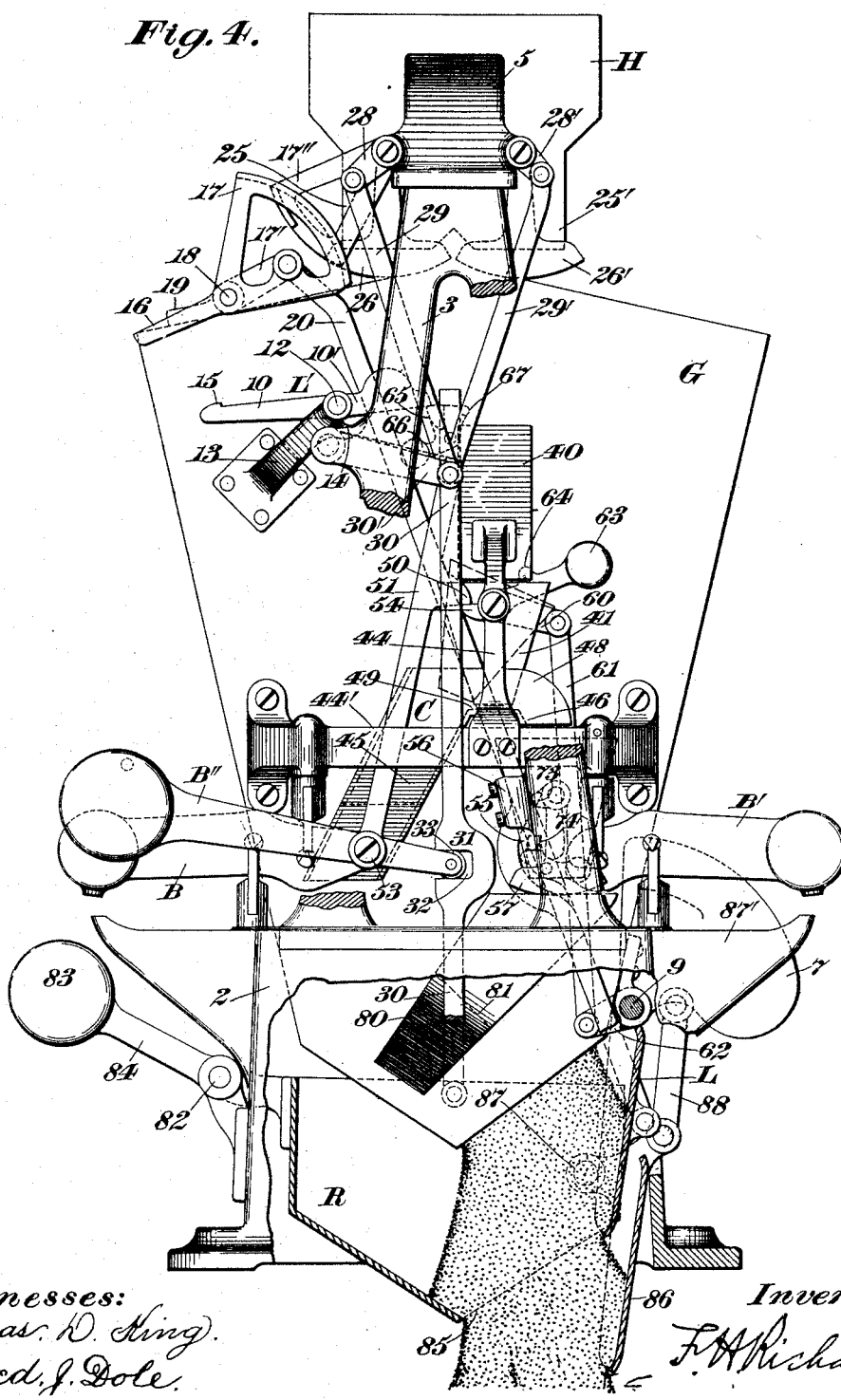

In the drawings accompanying and forming part of this specification, Figure 1 is a front elevation of a weighing-machine comprehending my present improvements. Figs. 2, 3, and 4 are end elevations of the machine as seen from the left in Fig. 1, and they illustrate the positions occupied by the various parts during the making and discharging of a load. Fig. 5 is a detail view of the overload-supplying valve mechanism. Fig. 6 is a detail view of the lower part of the machine, showing the bucket having returned to its normal position with the closer therefor almost shut and the regulator having nearly emptied its contents. Figs. 7, 8, and 9 are central vertical sections of part of the load-reducing means. Figs. 10 and 11 are similar views of the surplus-load receptacle and its valve, the latter being shown in its shut and open positions, respectively. Figs. 12, 13, and 14 are detail views of the actuator for the valve of the surplus-load receptacle, and Fig. 15 is a detail view of a tripper for the load-discharge-controlling latch.

Similar characters designate like parts in all the figures of the drawings.

The framework for carrying the various parts of the machine may be of any suitable or preferred construction, and in the form shown it consists of the hollow base or bed 2, the end frames 3 and 4, which rise therefrom, and the brackets 5 and 6, which extend oppositely from the chute or hopper H, said parts being joined together in some well-known manner.

The chute or hopper H, in connection with a series of stream controllers or valves, constitutes a convenient means for delivering the overload to the load-receiver.

The weighing mechanism includes a suitable load-receiver and beam mechanism therefor, and the load-receiver in the present case consists of a single-chambered vertically-reciprocatory bucket G, which is mounted upon the poising sides of the scale-beams B and B', the latter being fulcrumed upon the base or bed 2 in the usual manner.

The load-receiver is provided with the usual discharge outlet or opening, and for controlling the efflux of material therefrom the closer L is provided, such closer consisting of a flat plate adapted when shut to fit against the oblique lower portion of the load-receiver around the discharge edge thereof.

The closer L is furnished with the counterweighted end plates 7 and 7', (see Fig. 1, wherein the plate 7' is represented in dotted lines,) the function of said plates being to shut the closer on the discharge of a load.

The load-receiver at its front end is furnished with brackets 8 and 8', which pivotally sustain the rock-shaft 9, that is driven through openings in the plates 7 and 7', respectively, of the closer.

The closer-holding or load-discharge-controlling means includes a latch L', pivoted upon the bucket and consisting of two arms 10 and 10', respectively, which extend oppositely from the short rock-shaft 12, said shaft being carried by the bracket 13 on the load-receiver. The movement of the latch L' will be limited by a stop 14, which extends forward from the bracket 13, and upon which the counterweighted arm 10' of the latch is normally adapted to rest.

The latch-arm 10 is furnished with a shoulder 15, adapted to engage the arm 16 of the rocker or open segment 17, fixed to the stub-shaft 18 on the bracket 19, secured to the upper edge of the load-receiver, and said rocker has pivoted thereto the long connecting-rod 20, which is similarly attached to the closer L at a point about midway its ends.

The latch L' will normally engage the arm 16 of the rocker 17, and to effect a disengagement of these parts at the proper stage in the operation of the machine the counterweighted latch-arm 10' will be elevated to lower the working arm 10 thereof, so that the closer L' can be opened by the weight of the contents within the load-receiver G.

To prevent sagging of the closer, I connect therewith a second rod 20', which is articulated at its upper end to the crank-arm 17' on the load-receiver, the rod 20' moving in parallelism with the rod 20 as the closer reciprocates.

The hopper H, which constitutes part of the overload-supply means, is adapted to deliver a series of streams to the load-receiver, it having the spouts 25 and 25' for this purpose, the two streams being substantially of the same volume.

For controlling the supply or passage of material to the load-receiver from the hopper H, I provide the stream-controllers 26 and 26', which consist of valves of the "pan" type.

The valves 26 and 26' are carried for oscillation by the shafts 27 and 27', respectively, (see Figs. 1 and 2,) said shafts having journal-openings in their opposite ends for receiving pivot-screws carried by the framing of the machine in the ordinary manner. The valve 26 is reciprocatory below the outlet of the spout 25, and the valve 26' is likewise movable relatively to the spout 25' to cut off the two supply-streams, and for the purpose of actuating said valves to open and close the same alternately I connect them with the beam mechanism. The valve 26 will preferably have its closing movement in advance of that of the valve 26', so that the pressure of the supply on the load-receiver near the close of the overload-supply period will not be sufficient to carry the same rapidly downward, and for obtaining this operation the following means will be employed:

The valve-shaft 27 is provided with the crank-arm 28, and the valve-shaft 27' with a similar member 28'.

Links are shown at 29 and 29' pivoted to the crank-arms 28 and 28' at their upper ends and at their lower ends to the reciprocatory rod 30, the latter being preferably connected by a loose joint to the weighing mechanism and also by the link 30' to the side frame 3.

It will be observed that the crank-arm 28' is somewhat shorter than the crank-arm 28, so that on the downstroke of the rod 30 the valve 26 will be caused to shut in advance of the companion valve 26'. On the upstroke of the rod 30 the two valves will be opened by reason of the intermediate connections. The rod 30 is widened, as at 31, and such widened portion has a notch or recess 32 for the reception of the projection or antifriction-roll 33 on the inner end of the auxiliary beam B'', that is shiftably carried by the main beam B.

The two valves being wide open, as shown in Fig. 2, the supply will enter the load-receiver from the hopper H and will cause the same and the beam mechanism to descend, so that the auxiliary beam B'' will draw the rod 30 downward to close the two valves, whereby the supply is stopped when said valves are shut, as shown in Fig. 4. When the auxiliary beam B'' returns to its normal position, this operation will be reversed.

The chute H delivers to the load-receiver G a mass of material in excess of that determined upon for a load, the result being that the weighing mechanism is carried to a point below the poising-line, and at a certain stage in the descent of said load-receiver the surplus or excess will be removed, which causes the lightened load-receiver to rise, and when the proper amount of material has been withdrawn further removal of the contents of the load-receiver will be instantly stopped and the mechanism that controls the discharge of the load will be simultaneously set in operation.

To remove the surplus from the load-receiver, it will be furnished with a load-reducing opening at a point preferably between its receiving and delivery ends, such opening being the discharge-outlet of the spout 40, which leads from the load-receiver near the upper end thereof, and below which is located for oscillation a tubular load-reducing spout 41, the inlet-opening of which is adapted to register with the adjacent opening of the fixed spout 40.

The swinging spout 41 has the trunnions 42 and 43, which have journal-openings for receiving pivot-screws on the load-receiver G and the riser or upright 44, the last-mentioned part being attached, respectively, to the fixed spout 40 and the bucket-hanger 44'.

In connection with the swinging spout 41 there is provided a two-way conduit C, the branches 45 and 46 of which lead, respectively, toward and from the load-receiver, so that the material contained within the spout 41 can be delivered alternately into said branches at predetermined times in the operation of the machine.

When the material is withdrawn from the load-receiver to bring it to a true poise, such material will be delivered to the branch 46, from whence it passes into an auxiliary load-receptacle, which is preferably carried by the framework of the machine, as will hereinafter appear.

The conduit C is attached to the load-receiver in some well-known manner and its branch 45 will lead to an opening 47 therein. Said conduit will also be flanged, as at 48, to prevent the lateral escape and consequent waste of material during the weighing operation. The conduit C will be provided with a portion 49 between its branches 45 and 46, such portion being flat or horizontal, and over the same the outlet of the tubular spout 41 will be normally disposed, as represented in Fig. 2, to prevent the emergence of material from said spout until the right period.

The parts being in the positions shown in

Fig. 2 and both the overload-supply valves 26 and 26' being open, the full volume of the supply can enter the load-receiver G to carry the same downward and below the so-called "poising-line." When the load-receiver has nearly reached the end of its descending movement, the spout 41 will be swung to the right by means hereinafter described, so that its contents and part of the contents of the load-receiver can pass into the branch 46 of the conduit C to bring the load to a true poise. When the lightened load-receiver rises, the spout 41 will be returned to its normal position over the plate 49 by a suitable actuator, which plate then acts to cut off the supply.

The actuator for swinging the spout 41 to effect the removal of the surplus from the bucket to thereby bring the load to a poise is connected with the weighing mechanism, and it consists of the projection 50 on the reciprocatory rod 51. Said rod 51 is connected at its upper end with the frame 3 by the interposed guide-link 52, and at its lower end is loosely joined to the projecting pivot 53, that connects the main and auxiliary beams B and B''.

The projecting trunnion 42 of the spout 41 is furnished with a lug 54, which is disposed in the path of movement of the actuator or projection 50, so that as the weighing mechanism and rod 51 move downward on the overloading of the load-receiver the lug will be engaged by said projection and the spout 41 will be swung to the right, as represented in Fig. 3, to remove a portion of the contents of the bucket that first pass through the inclined stationary spout 40.

For the purpose of retaining the material withdrawn from the load-receiver I provide the auxiliary load-receptacle 55, which is suitably fastened to a projection 56, extending inward from the frame 3, said auxiliary load-receptacle being in the form of a hopper or box located below the branch 46 of the conduit C.

To prevent the material from running through the auxiliary load receptacle or hopper 55 except when necessary, I furnish the same with an oscillatory valve 57, which is pivoted to said hopper and which has a preponderance of weight below its axis to normally maintain it shut.

Means are provided for restricting the action of the swinging spout 41, so that it cannot deliver its contents to the branch 45 until the load is poised, such means being preferably operative with the closer L.

The trunnion 43 of the load-reducing spout 41 has sleeved thereon the crank-arm 60, to the outer end of which is pivoted the rod or link 61, the latter being also jointed to the crank-arm 62 on the closer-shaft 9, and it will be evident that so long as the closer L is shut the crank-arm 60 is in the nature of a fixed or stationary member of the load-receiver and that it acts as a stop to limit the action of the load-reducing spout 41. The trunnion 43 is furnished with the counterweighted actuator 63, which is provided with a laterally-projecting pin 64, sustained by the crank-arm 60 during the normal operation of the machine, as represented in Fig. 2, whereby the spout cannot prematurely swing to the left to deliver its contents to the branch 45 of the conduit C as the actuator 50 ascends.

When the closer is opened, the rod 61 and crank-arm 60 will be drawn downward, which results in the release of the spout-actuator 63, so that the spout 41 can be swung thereby to direct its contents and the contents of the spout 40 to the branch 45 of the conduit C, such contents forming a part of the true load, it being understood that the actuator 50 has risen to a point a short distance above lug 54, due to the lightening of the load-receiver. The branch 45 will of course deliver the material to the load-receiver G through the opening 47.

To trip the closer-holding latch L', I provide the tripper 65, it being of the "by-pass" type and represented pivoted near the upper end of the reciprocatory rod 51, said tripper being furnished with an actuating-weight 66, the function of which will now be specified.

At the commencement of operation, as illustrated in Fig. 2, the inside face of the tripper 65 will be contiguous to the free end of the latch L'.

When the weighing mechanism and rod 51 descend, the tripper 65 will be carried therewith, so that it will be sprung under the latch by its weight 66 and until the pin 67 thereon meets the rod 51, as shown in Figs. 3 and 15.

When the material constituting the overload has been withdrawn and the load-receiver has reached the poising-line, the tripper 65 will have lifted the weighted arm 10' of the latch and lowered the arm 10 thereof to disengage the latter from the rocker-arm 16, so that the closer L will be freed of all restraint, and it can then be forced open by the pressure of the mass within the load-receiver, as indicated in Fig. 4. As the closer opens, the crank-arm 60, by reason of its connection therewith, will be forced away from the pin 64 on the counterweighted arm 63 of the spout 41, so that said spout can be swung to deliver its contents and the contents of the stationary spout 40 into the conduit branch 45, from whence the material passes into and through the load-receiver through the opening 47 therein, as it forms a part of the load.

While the material within the spouts 40 and 41 constitutes a part of the true load, that which is confined within the auxiliary load-receptacle 55 does not, and means will be provided for emptying said auxiliary load-receptacle and conducting its contents to the load-receiver to form the first part of the succeeding load, and the means for emptying the auxiliary load-receptacle will be preferably operated by the closer as it is shut.

The actuator for the valve 57 of the auxiliary load-receptacle is designated by 70, and it is pivoted to a bent lug or ear 71 on the rod or link 61. (See Figs. 12, 13, and 14.) The actuator 70 is in the form of a counterweighted dog, it being provided with a boss 72, adapted to abut against the bent lug or ear 71, as shown in Fig. 12. The inside hub of the valve 57 is furnished with a crank-pin 73, with which the actuator 70 is adapted to coöperate. The actuator 70 is equipped near its upper end with a lug 74, the inside face of which is curved, as at 75.

When the load-receiver G is in its highest position, as shown in Fig. 2, the curved face 75 of the actuator will be in contact with the crank-pin 73. When the load-receiver descends, the actuator 75 will pass out of contact with the said pin 73, so that the stop 72 of said actuator will be caused to abut against the lug or ear 71 on the link 61.

When the closer opens, the valve-actuator 70 will be carried farther downward and below the pin 73. On the shutting of the closer and the rise of the empty load-receiver G the upper straight edge 76 of the actuator will impinge against the pin 73 of the valve 57 to force the latter open, as shown in Fig. 11, to discharge the auxiliary load-receptacle 55, and on the continued ascent of the bucket the straight edge 76 will pass out of contact with the pin 73, the latter being subsequently engaged by the curved face 75 to again hold the stop 72 away from the bent lug 71.

To convey the material from the auxiliary load-receptacle 55 to the empty load-receiver, I provide the conduit 80, which leads to the opening 81 in the load-receiver, and the receiving end of which is placed below the outlet of the auxiliary load-receptacle.

There is mounted below the bucket a regulator-hopper R, which is pivotally supported, as at 82, at one side thereof, said hopper being furnished with a counterbalance-weight 83 at the outer end of the arm 84. This hopper is adapted to receive the contents discharged from the load-receiver G, so that it can remain in its depressed position for a relatively long period of time, and being connected with the valve mechanism the valves 26 and 26' will be held against opening until the material has passed from the regulator. The regulator-hopper has pivoted at one side thereof the rod 30, (see Fig. 2,) and it will be evident that said regulator will be carried downward with the weighing mechanism. When the load is discharged into the regulator, its return movement will be retarded, and said regulator being connected by rod 30 with the auxiliary beam B'', which constitutes an actuator for the two valves, said beam cannot return to its normal position with the main beam B. When the contents of the regulator are completely discharged, the auxiliary beam B'' will be released and can drop to its normal position and in so doing will force the two valves 26 and 26' open by reason of the intermediate connections, the regulator R being also elevated by said beam B''.

The outlet 85 of the hopper R is provided with a flat valve 86, which is pivoted to said regulator at 87.

For the purpose of prolonging the period of depression of the hopper R and for opening and shutting said valve as the hopper reciprocates I prefer to connect said valve with a suitable resistance member, such as the arms 87' and 87'' on the base 2, the links 88 and 88', which are pivoted to these members, being conveniently employed for this purpose. As the regulator R drops the valve 86 will be simultaneously opened by reason of its connection with the framework, so that it presents a relatively wide surface against which the escaping material from the load-receiver G can act.

The mass within said regulator by acting against the open closer L tends to check the closure thereof until all the material has passed below the lip or discharge edge of said closer.

The rocker or segment 17 constitutes a stop, a coacting stop being represented at 17' as connected with the valve 26, said stops being so operable that the valves and the closer cannot be opened simultaneously, as shown in my prior patent hereinbefore alluded to.

The operation of the hereinbefore-described machine, briefly stated, is as follows: Fig. 2 represents the positions occupied by the respective parts at the commencement of operation, the closer L being shut and held in such position by the latch L', which is in engagement with the arm 16 of the rocker 17, and both valves being open a large supply of material will enter and overload the load-receiver. The weighing mechanism, including the overloaded load-receiver, will now promptly descend, thereby shutting the valves, and when it has nearly reached the limit of such movement the actuator or projection 50 will be carried against the lug 54 of the spout 41, thereby swinging said spout to the right to remove a certain amount of material from the load-receiver and to deliver the same to the auxiliary load-receptacle 55. When the load-receiver is in its highest position, the latch-tripper 65 will be against the free end of the latch, as shown in Fig. 2, and when the load-receiver is carried downward by the overload said tripper will be swung under the weighted arm 10' of the latch by the action of its weight 66, as indicated in Fig. 3. As the lightened bucket rises in the manner just specified the spout 41 will be swung to the left until its outlet is over the cut-off portion 49 of the branch 45, which stops the further removal of material from the bucket. When the true load is in the bucket, the tripper 65 will lift the weighted arm 10' of the latch L' and will depress the arm 10 thereof, thereby disengaging the latter from the rocker 17, and consequently releasing the closer L, so that the latter can be forced open by the charge within the load-receiver, which is delivered to the regulator-hopper R. As the closer opens, the rod 61 and the crank-arm 60 will be drawn downward, so that the spout 41 can be swung to the left, as shown by the dotted lines in Fig. 4 and the sectional view, Fig. 9, to deliver the contents of the spouts 40 and 41 to the branch 45, from whence the material passes into and through the empty load-receiver. When the load has been fully discharged, the closer L can shut, and in so doing it is operable, through the hereinbefore-described instrumentalities, for opening the valve 57 to permit the material from the auxiliary load-receptacle 55 to pass into the conduit 80, such material being then delivered into the empty load-receiver. When the discharged mass has passed from the hopper R, the latter will be released and can be returned to its normal position by the dropping of the auxiliary beam B''', with which it is connected, the two valves 26 and 26' being simultaneously opened by the intermediate connections.

Having described my invention, I claim—

1. The combination, with weighing mechanism including a load-receiver having a load-reducing opening, of a swinging spout situated to remove material from the load-receiver through said opening during the weighing of a load.

2. The combination, with weighing mechanism including a load-receiver having a load-reducing opening, of overloading means; and a swinging spout situated to remove material from the load-receiver through said opening during the weighing of a load.

3. The combination, with a load-receiver having a stationary spout leading therefrom, of a swinging spout supported below said stationary spout and operable to remove material from the load-receiver through said first-mentioned spout during the weighing of a load.

4. The combination, with weighing mechanism including a load-receiver; of a two-way conduit, the branches of which lead toward and from the load-receiver; means for removing material from the load-receiver and delivering it to the branch of said conduit that leads from said load-receiver during the weighing of a load; and a valved auxiliary load-receptacle disposed below said last-mentioned branch of the conduit.

5. The combination, with weighing mechanism including a load-receiver; of a two-way conduit, the branches of which lead, respectively, toward and from said load-receiver, said conduit being provided with a cut-off portion; a swinging spout normally located over said cut-off portion; and means for swinging said spout to deliver its contents alternately to the branches of the conduit.

6. The combination, with weighing mechanism including a load-receiver; of a two-way conduit, the branches of which lead toward and from the load-receiver; a swinging spout located to remove material from said load-receiver; and means operated by the weighing mechanism, for actuating said spout to deliver its contents to one of the branches of the conduit during the weighing of a load.

7. The combination, with weighing mechanism including a load-receiver; of a two-way conduit, the branches of which lead toward and from said load-receiver; a swinging spout located to remove material from the load-receiver; means operated by the weighing mechanism, for actuating said spout to deliver its contents into the branch of the conduit that leads from the load-receiver during the weighing of a load; and an actuator for oppositely swinging said spout at the conclusion of the weighing operation, whereby its contents will be delivered to the other branch of said conduit.

8. The combination, with weighing mechanism including a load-receiver having a load-reducing opening; of a two-way flanged conduit, the respective branches of which lead toward and from the load-receiver; a swinging spout situated adjacent to said opening; and means for swinging said spout toward the branch of the conduit that leads from the load-receiver during the weighing of a load, and for oppositely swinging said spout at the conclusion of the weighing operation.

9. The combination, with weighing mechanism including a load-receiver having a load-reducing opening; of a two-way flanged conduit, the respective branches of which are inclined and lead toward and from the load-receiver, one of them being in communication with an opening in said load-receiver, said conduit also having a flat cut-off portion between its branches; a swinging spout situated adjacent to the load-reducing opening and normally located over said cut-off portion; and means for swinging said spout toward the branch of the conduit that leads from the load-receiver during the weighing of a load, and for oppositely swinging said spout at the conclusion of the weighing operation.

10. The combination, with a load-receiver having a closer, of a two-way conduit the branches of which lead toward and from the load-receiver; a swinging spout situated to remove material from the load-receiver through an opening therein during the weighing of a load and to deliver it into one of the branches of said conduit; and means connected with the closer, for preventing the movement of said spout toward the other branch of the conduit while the closer is shut.

11. The combination, with a load-receiver having a closer, of an oscillatory load-reducing device; a two-way conduit, the respective branches of which lead toward and from the load-receiver; actuating means for swinging said load-reducing device in one direction; and means connected with the closer, for limiting the opposite action of said load-reducing device during the weighing of a load.

12. The combination, with weighing mechanism including a load-receiver having a closer, of overloading means; load-reducing means including a swinging spout; an actuator for said spout, provided with a pin; and a member connected with the closer, situated to uphold said pin for a predetermined length of time.

13. The combination, with weighing mechanism including a load-receiver provided with a closer, of overloading means; load-reducing means embodying a swinging spout having trunnions; a crank-arm loosely connected to one of the trunnions and also with said closer; and an arm projecting from said spout, furnished with a pin that is upheld by said crank-arm.

14. The combination, with weighing mechanism including a load-receiver provided with a closer, of overloading means; load-reducing means including a swinging spout provided with a counterweighted actuator furnished with a pin, said spout also having trunnions; and a crank-arm loosely connected to one of the trunnions and situated normally to uphold said pin, said crank-arm being connected with the closer.

15. The combination, with weighing mechanism including a load-receiver provided with a closer, of overloading means; load-reducing means including a swinging spout; an actuator for swinging the same in one direction, said actuator being furnished with a pin; an actuator connected with the weighing mechanism, for oppositely swinging said spout during the weighing of a load; and a crank-arm connected with the closer and situated to uphold said pin.

16. The combination, with weighing mechanism including a load-receiver provided with a closer, of overloading means; a two-way conduit, the branches of which lead toward and from the load-receiver, respectively; a swinging spout situated to remove material from an opening in the load-receiver during the weighing of a load and to deliver it into the branch of said conduit that leads from the load-receiver; an auxiliary valved load-receptacle adapted to receive the material removed from the load-receiver; means connected with the closer, for preventing the action of said spout in one direction when the closer is shut; and means also connected with the closer, for actuating the valve of the auxiliary load-receptacle on the opening of said closer.

17. The combination, with a load-receiver, of load-discharging means; and a valved regulator-hopper situated below said load-receiver and adapted to receive the contents therefrom, the valve of said hopper being connected with the framework.

18. The combination, with a load-receiver, of a valved regulator-hopper situated below the load-receiver and adapted to receive the contents therefrom; and a resistance member connected with the valve of said hopper.

19. The combination, with a load-receiver, of a valved regulator-hopper situated to receive the contents discharged from said load-receiver; a resistance member; and a link attached, respectively, to said resistance member and valve.

20. The combination, with weighing mechanism including a load-receiver, of a valved regulator-hopper situated to receive the contents discharged from said load-receiver and connected with the weighing mechanism; and a connection between the valve of the regulator-hopper and the framework.

21. The combination, with weighing mechanism including a load-receiver, of overloading means embodying a valve; a shiftable valve-actuator; and a valved regulator-hopper, the valve of which is connected to the framework, said hopper being also connected with the valve-actuator and with said first-mentioned valve.

FRANCIS H. RICHARDS.

Witnesses:
 FRED. J. DOLE,
 HENRY BISSELL.